April 13, 1965 L. J. GAUSE 3,177,524
MEAT MOLDING MACHINE
Filed March 25, 1963 4 Sheets-Sheet 4
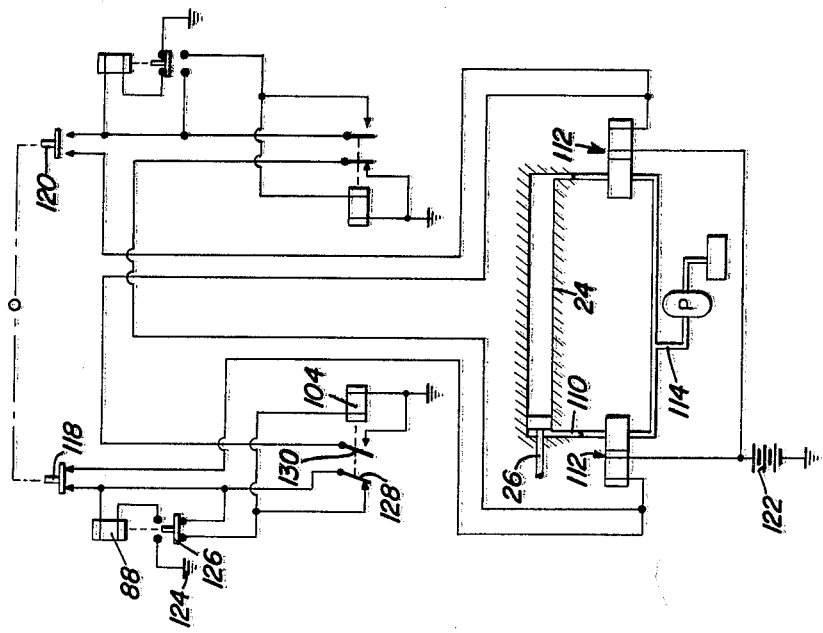
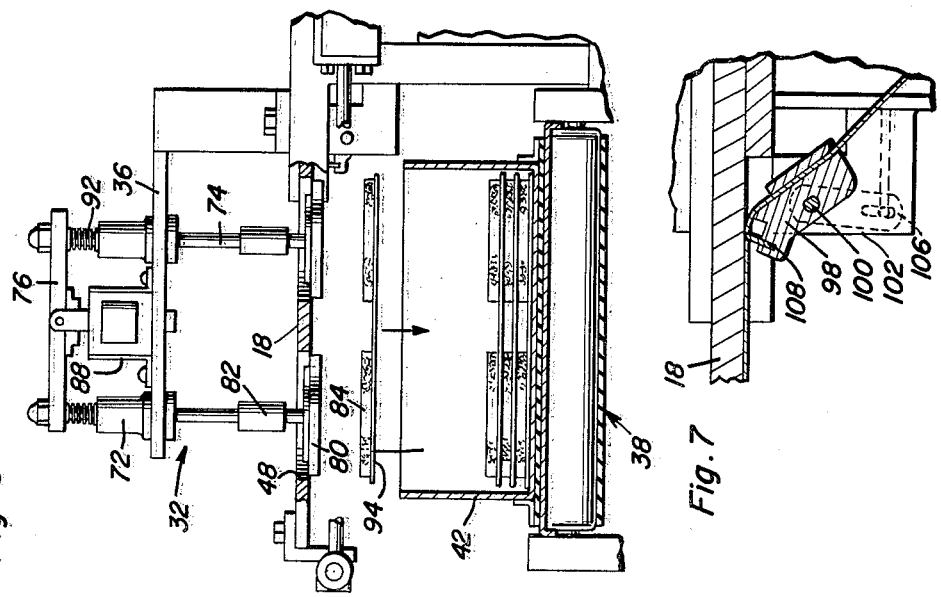
Lawrence J. Gause
INVENTOR.

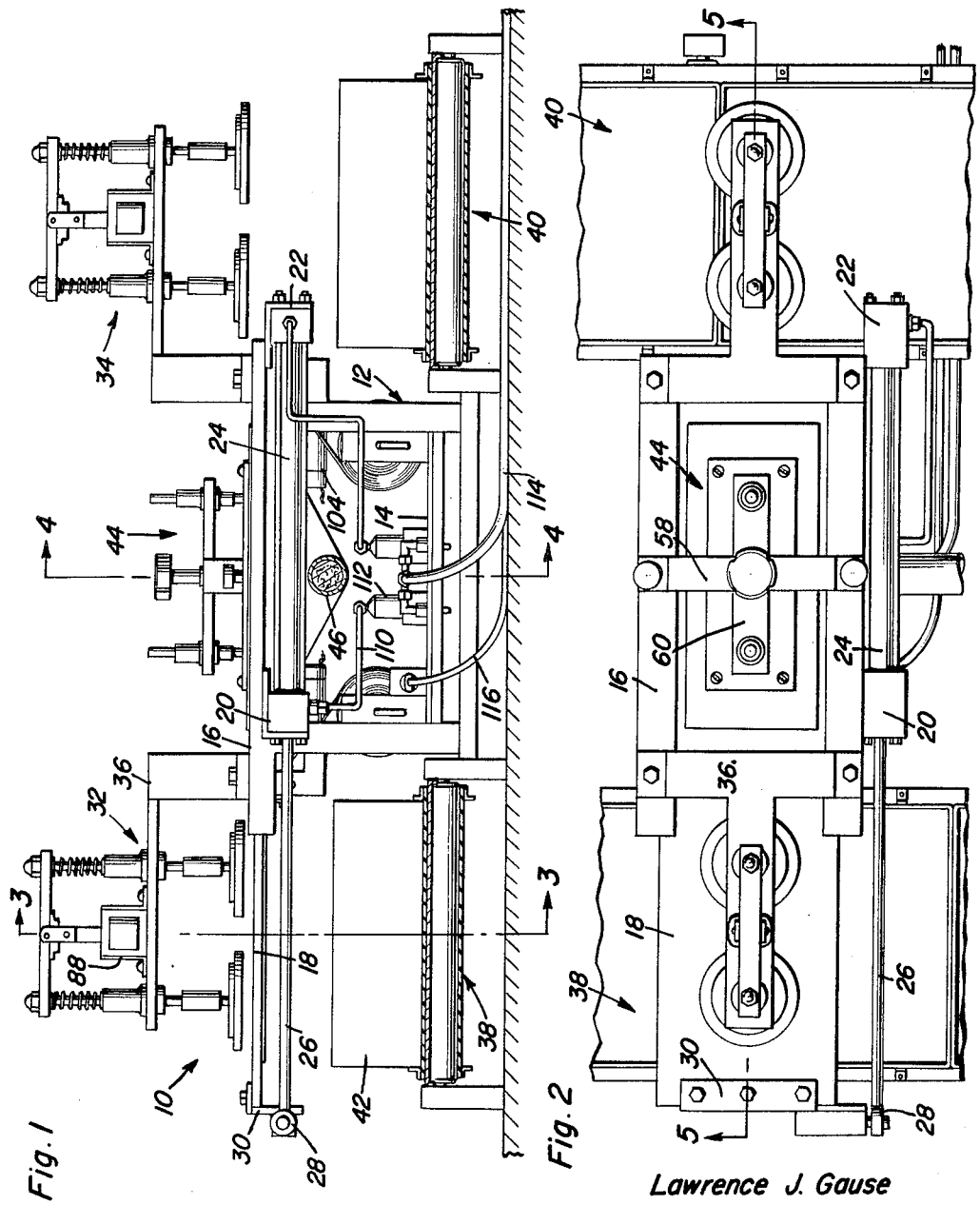

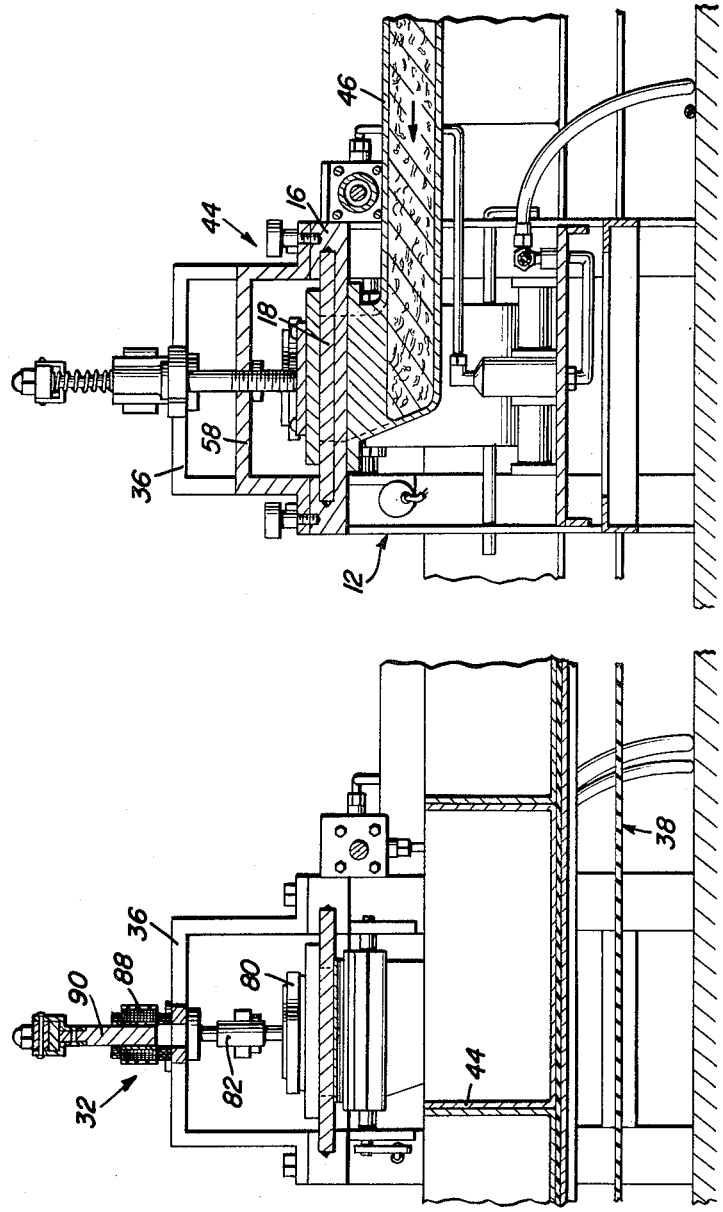

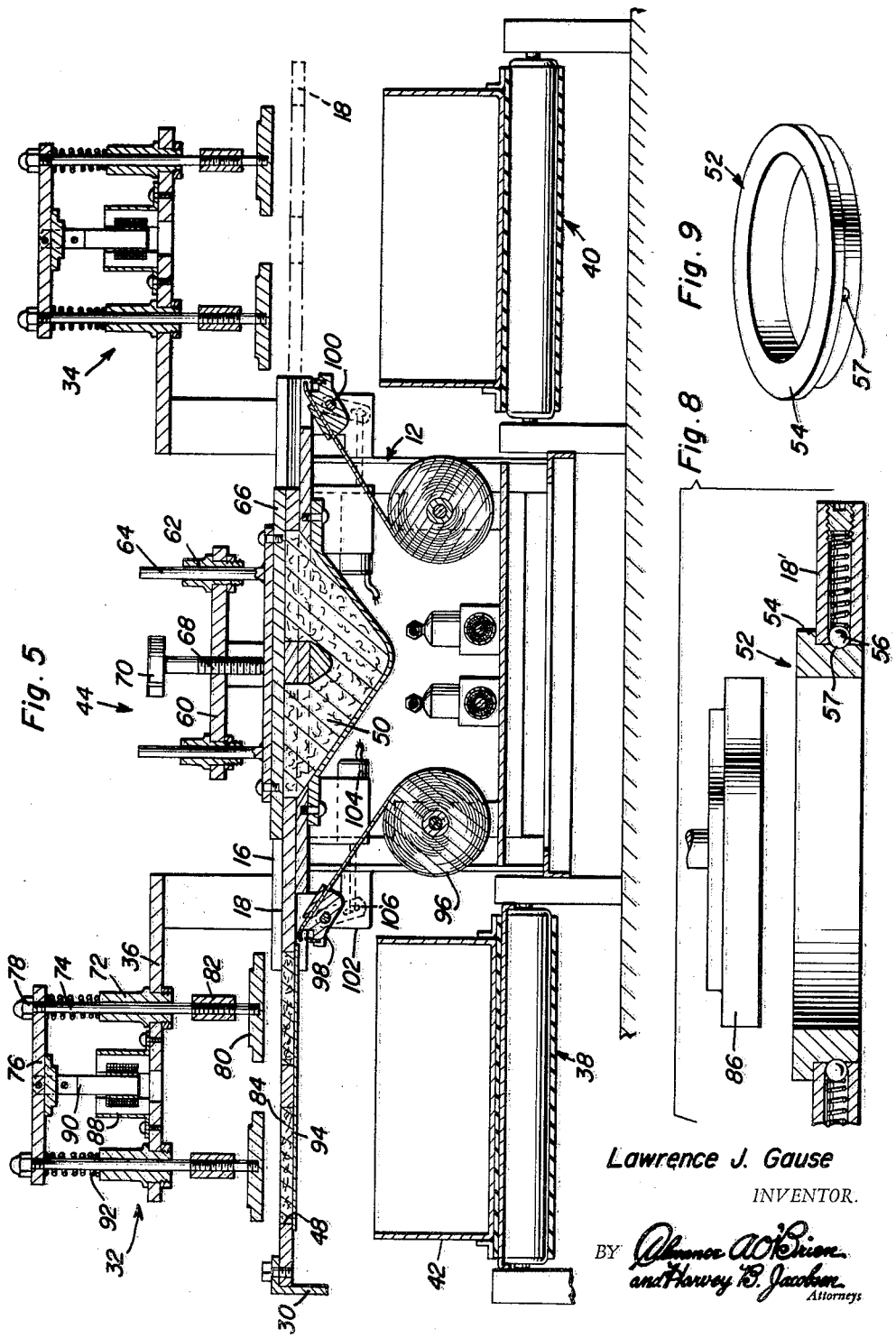

United States Patent Office

3,177,524
Patented Apr. 13, 1965

1

**3,177,524
MEAT MOLDING MACHINE**
Lawrence J. Gause, Santa Barbara, Calif., assignor of forty-nine percent to Claude M. Snyder, Goleta, Calif.
Filed Mar. 25, 1963, Ser. No. 267,490
5 Claims. (Cl. 17—32)

This invention relates to apparatus for molding plastic materials such as ground meat, to form meat patties. More particularly, the invention involves the rapid and sanitary formation of meat patties and deposits thereof in separated layers in containers without contact with any part of the human anatomy.

It is therefore a primary object of the present invention to provide a machine to which plastic or moldable material such as ground meat, is fed under a continuous and relatively low pressure for the purpose of forming the ground meat into patties in a rapid manner so as to prevent deterioration thereof and with little likelihood of contamination of the meat by the facilities for handling the meat.

An additional object of the present invention, is to provide a meat patty forming machine from which meat patties are discharged for deposit in layers separated by a separating material such as lining paper. The separating paper in accordance with the present invention, is derived from a continuous sheet stored by the machine in roll form, the sheet being fed and severed in a novel manner so as to avoid disturbance of the meat patties by relative sliding between the layers and avoiding the expense of precut sections of paper.

In accordance with the foregoing objects, an advantageous feature of the present invention resides in a molding slide plate which is reciprocated between two limit positions, the slide plate having a plurality of mold openings therein, each opening being utilized whenever the mold slide is in one of its two limit positions either for presenting molded patties to a knockout or discharge mechanism for deposit thereof into a container or for receiving the ground meat therein to form the patty. Thus, the machine is operative two times each stroke of its mold slide to deposit molded meat patties as well as to simultaneously receive ground meat under pressure to form the meat patties. More rapid handling of the ground meat is thereby made possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the meat molding machine in one of its operative positions.

FIGURE 2 is a top plan view of the meat molding machine shown in FIGURE 1.

FIGURE 3 is a transverse sectional view on an enlarged scale taken substantially through a plane indicated by section line 3—3 in FIGURE 1.

FIGURE 4 is a transverse sectional view on an enlarged scale taken substantially through a plane indicated by section line 4—4 in FIGURE 1.

FIGURE 5 is a longitudinal sectional view on an enlarged scale taken substantially through a plane indicated by section line 5—5 in FIGURE 2.

2

FIGURE 6 is a partial side elevational view with parts broken away and shown in section, illustrating the machine in another operational phase.

FIGURE 7 is an enlarged partial longitudinal sectional view illustrating the paper guide and severing device in one of its operational phases.

FIGURE 8 is an enlarged partial sectional view of a portion of modified form of mold slide plate having an insert for varying the dimension of the meat patty being formed.

FIGURE 9 is a perspective view of the insert illustrated in FIGURE 8.

FIGURE 10 is an exemplary control circuit that may be associated with the meat molding machine for effecting automatic operation of the machine.

Referring now to the drawings in detail, it will be observed from FIGURES 1 and 2, that the machine generally referred to by reference numeral 10 includes a central frame assembly 12 supporting a mounting base 14 spaced above the floor and a pair of parallel spaced channel track members 16 between which a mold slide plate 18 is reciprocated between two limit positions. Accordingly, secured to one side of the frame assembly by means of the brackets 20 and 22, is a fluid actuating device or air cylinder 24. The air cylinder is operative through a piston rod 26 extending therefrom to impart reciprocatory movement to the mold slide 18 between its two limit positions. The piston rod 26 is therefore pivotally connected by the connection 28 to a bracket 30 secured to one end of the mold slide 18 so that when the piston rod 26 is extended to the end of the stroke, the mold slide 18 will be in one of its limit positions, such as illustrated in FIGURES 1 and 2. The piston rod 26 will therefore be retracted within the air cylinder 24 during the return stroke so that the mold slide may then be displaced toward the other limit position as shown by dotted line in FIGURE 5. Accordingly, disposed above the mold slide 18 in both of its limit positions, are ejector or knockout assemblies generally referred to by reference numerals 32 and 34. Each of the knockout assemblies is supported in proper position by means of a supporting bracket assembly 36 secured between the track members 16. The knockout assemblies are also vertically aligned above conveyor belt assemblies 38 and 40 respectively so that separated layers of patties may be deposited within containers 42 supported on the conveyor assemblies adapted to be moved from beneath the knockout assemblies when the containers are fully loaded. The conveyor assemblies are therefore supported on the opposite longitudinal sides of the central frame assembly 12. Also supported between the track members 16 centrally of the frame assembly 12, is a pressure backing assembly generally referred to by reference numeral 44. The pressure backing assembly 44 cooperates with the mold slide 18 to receive plastic material such as ground meat under continuous pressure through a supply conduit 46 which extends laterally from the machine as more clearly seen in FIGURES 1 and 4.

The mold slide plate 18 as more clearly seen in FIGURE 5, is provided with a plurality of spaced mold openings 48 so arranged that a plurality of mold openings will be operatively aligned beneath either the knockout assembly 32 or 34 depending upon the limit position to which the mold slide has been displaced. Accordingly, one of the two knockout assemblies will be active at all times in order to effect the deposit of meat patties discharged from the mold openings 48. Also in the exemplary illustration, two mold openings are shown operatively aligned with one of the knockout assemblies when the mold plate is in one of its limit positions. The other two mold openings or the remaining mold openings will at the same time be operatively aligned with two inlet branches 50 connected to the supply conduit 46 through which plastic material is introduced into the mold openings. It will therefore be apparent, that the diameter or thickness of the meat patties molded in the mold openings 48 will depend upon the diameter of the mold openings and the thickness of the mold slide 18. In order to vary the dimension and weight of the meat patties, inserts 52 may be mounted within the mold openings of a modified form of mold plate 18′ as shown in FIGURES 8 and 9. The inserts are of various dimensions in accordance with the dimensional requirements of the meat patties to be formed and each includes a top flange portion 54 which is seated on top of the mold plate and are held in place by spring pressed detents 56 mounted in the plate 18′ and received in the recesses 57 in the insert. When the inserts are used in connection with the modified form of mold plate 18′, adjustment of the pressure backing assembly 44 will be necessary as well as replacement of some of the parts of the knockout assemblies 32 and 34 in accordance with the dimensional change effected.

Referring therefore to FIGURES 2, 4 and 5, it will be observed that the pressure backing assembly includes a bridging bracket 58 secured to the track members 16 and straddling the mold slide 18 therebelow. Secured to the bracket 58 centrally above the mold slide 18 is a pressure adjusting bracket 60. Secured adjacent opposite ends of the pressure adjusting bracket 60, are a pair of guide elements 62 which slidably receive a pair of parallel guide rods 64 to which a pressure plate 66 is secured. Pressure is adjustably applied to the pressure plate 66 by means of an adjusting screw 68 threadedly mounted by the pressure adjustment bracket 60. The adjustment screw 68 therefore bears at its lower end against the pressure plate so as to adjustably space the pressure plate from the adjustment bracket 60. Adjustment knob 70 is therefore connected to the upper end of the adjustment screw for such purpose. It will be apparent, that when inserts 52 are utilized, upward adjustment of the pressure plate 66 will be necessary inasmuch as the pressure plate must accommodate sliding movement of the mold slide 18 therebelow. It will also be apparent, that when the mold slide is in either of its limit positions, two of the mold openings 48 will be aligned with the inlet branches 50 below the pressure plate 66 so that these mold openings will form mold cavities with the pressure plate into which the ground meat will be pressed. Accordingly, slidable movement thereafter imparted to the mold slide will displace molded meat patties from a meat receiving position below the pressure backing assembly 44 to the patty depositing position under one of the knockout assemblies 32 or 34.

Referring now to FIGURES 3 and 5 in particular, it will be observed that each of the knockout assemblies 32 include a pair of guide elements 72 secured to the supporting bracket 36. The guide elements slidably mount a pair of vertical rods 74 interconnected by a connecting bar 76 for simultaneous movement. Accordingly, the upper ends of the rods 74 are secured to the connecting bar by the fastener assemblies 78 while the lower ends of the rods 74 are removably secured to ejector elements 80 by means of any suitable removable coupling 82. The ejector elements 80 will be slightly less in diameter than the mold openings 48 with which they are aligned when the mold slide is in its limit position as illustrated in FIGURE 5. Accordingly, downward movement of the elements 80 by the rods 74 will displace the molded meat patties 84 from the mold openings 48 so that they may be deposited into the container 42 disposed therebelow. It will also be apparent, that when inserts 52 are utilized, the ejector elements must be replaced by dimensionally smaller elements 86 as shown in FIGURE 8 so that the elements are movable through the smaller opening formed by the insert. A knockout solenoid device 88 is mounted on the bracket 36 between the guides 72 and has an armature 90 associated therewith, the upper end of said armature being connected to the connecting bar 76 so that upon energization of the solenoid 88, the armature 90 will downwardly displace the rods 74 and elements 80 connected thereto against the bias of the springs 92 which react between the bottom of the connecting bar 76 and the tops of the guides 72, the springs 92 being disposed about the rods 74. It will therefore be apparent, that upon energization of the solenoid 88, two meat patties 84 will be discharged into the container 42 together with a severed section 94 of separating material such as lining paper which adheres to the bottom of the meat patties as more clearly seen in FIGURE 6. A similar action occurs with respect to the knockout assembly 34 when the mold slide 18 is in the other limit position as shown by dotted lines in FIGURE 5.

The section 94 of separating material is fed from a continuous roll of paper from the storage roll 96 rotatably mounted by the central frame assembly 12. Two of such rolls are provided so that separating paper may be withdrawn therefrom by adhesion of the paper to the meat patties being moved from a material receiving position to the patty discharge position below both of the knockout assemblies 32 and 34. Accordingly, the continuous sheet of paper withdrawn from the rolls 96 extend through pivoted guide members 98 rotatably mounted by shafts 100 in supporting brackets 102 that extend from opposite sides of the central frame assembly 12. The separating paper may thereby be held below a mold slide 18 so that when it is moved, the meat patty displaced from its material receiving position will contact the lining paper and withdraw it through the guide member 98. After the mold slide reaches its limit position with the separating paper therebelow, energization of a cut-off solenoid 104 associated with each of the guide members 98, will cause pivoting thereof by linkage connection 106 shown in dotted line so as to render a cutter blade 108 as more clearly shown in FIGURE 7, operative to sever the section 95 from the storage roll. The severing action is therefore designed to occur simultaneously with the energization of the solenoid 88 associated with the knockout assembly so that the lining section 94 will be severed when the meat patties adhering thereto are discharged into the container 42.

In order to effect reciprocatory movement of the mold slide, the cylinder 24 is operatively connected at opposite ends thereof to a pair of fluid lines 110 through which air under pressure is supplied by a pair of solenoid operated valve assemblies 112. Accordingly, compressed air inlet line 114 is connected to the solenoid operated valve assemblies 112 whereby fluid under pressure may be conducted to both or either of the ends of the air cylinder 24 in order to effect reciprocatory movement of the mold slide or hold the mold slide in its limit position for a sufficient length of time to discharge mold meat patties from two of the mold openings and fill up the other mold openings with the ground meat for subsequent displacement to the inactive knockout assembly. Electrical energy for operating the solenoid operated valve assemblies 112, the solenoid 88 associated with the active knockout assembly and the solenoid 104 associated with the active guide cutter member 98, is furnished through the electrical power line 116 as shown in FIGURE 1. A suitable control system will therefore be associated with the meat molding machine of the present invention so as to energize the solenoid devices in proper sequence in order to operate the machine as hereinbefore described.

Referring therefore to FIGURE 10, one exemplary control circuit is illustrated for achieving the aforementioned operation of the machine in the proper sequential manner. Thus, as seen in FIGURE 10, when the mold slide is disposed in one of its limit positions, a limit switch 118 may be closed corresponding to that limit position while the limit switch 120 associated with the other limit position will be opened. Closure of the limit switch 118 will thereby be effective to establish energizing circuits from the source of power 122 through the solenoid valve assembly 112 in parallel with the knockout solenoid device 88 then connected to ground 124. Accordingly, fluid will be admitted through both valve assemblies 112 in order to stop movement of the piston and mold slide connected thereto while downward movement will be imparted to the ejector elements 80 of the knockout assembly. As the knockout assembly is moved downwardly, limit switch 126 may be actuated to the position illustrated in FIGURE 10 so as to close an energizing circuit through the cutoff solenoid 104 whereupon a solenoid holding switch 128 is closed as illustrated in order to maintain the cutoff solenoid 104 energized when the limit switch 126 is opened as the springs 92 withdraw the knockout assembly upwardly. Energization of the solenoid 104 will also open the switch 130 so as to interrupt the grounded energizing circuit previously established therethrough for the solenoid valve assembly 112 previously energized so as to displace the mold slide to the limit position in which the foregoing action occurred. The air cylinder will then begin to retract piston rod 26 in order to move the mold slide toward the other limit position. When the mold slide reaches the other limit position, the limit switch 120 associated therewith will close and the limit switch 118 will open so as to then deenergize the previously energized solenoid 104 whereupon the switch 130 will close in order to energize the other solenoid valve assembly 112 in order to stop movement of the mold slide at the other limit position. Thus, the foregoing cycle will be repeated in the other limit position of the mold slide. It will be appreciated of course, that many other control systems may be utilized in order to effect reciprocation of the mold slide between its limit positions and holding of the mold slide at the limit position for a sufficient length of time to effect discharge of the mold patties and severing of the separating material before movement is resumed.

From the foregoing description, the operation, construction and utility of the meat molding machine will be apparent. It will therefore be appreciated, that meat patties may be formed more rapidly and with a minimum amount of contact with the machine parts so as to avoid contamination. It will also be appreciated that the molding and movement of the meat patties is achieved without use of any gears, wheels or pulleys requiring lubrication in order to insure the existence of sanitary conditions. Also, the automatic severing of the separating material and the manner in which it is fed avoids the expense of precut paper as well as to eliminate causes of malfunction and relative sliding between the patty layers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A meat molding machine comprising, a horizontal track frame having a pair of inlet openings, a mold plate slidably mounted by the track frame for movement between limit positions projecting horizontally from opposite sides of the track frame along the direction of said movement, said mold plate having two pairs of mold openings, each pair of mold openings being alternatively aligned with the inlet openings and spaced therefrom in the limit positions of the mold plate, a supply conduit connected to the track frame and extending transverse to said direction of movement below the mold plate, a backing member rigidly mounted in adjusted position on the track frame vertically spaced above the inlet openings therein to form mold cavities with the mold openings communicating with the supply conduit through said inlet openings, a pair of ejector assemblies mounted above the track frame on opposite sides thereof in alignment with the mold openings when the mold plate is in the limit positions thereof, each of said ejector assemblies having vertically reciprocated ejector elements movable through said mold openings, a pair of conveyors operatively mounted below said ejector assemblies movable in directions transverse to said direction of movement of the mold plate, a pair of rolls of sheet material mounted below the track frame, guide means mounted on opposite sides of the supply conduit holding the sheet material in contact with the mold plate for adhesion to moldable material carried in the mold openings, cutting means automatically operative to sever the sheet material alternatively withdrawn from the rolls in response to movement of the mold plate, when the mold plate is in the limit positions thereof, fluid operated means operatively connected to the mold plate for movement thereof between said limit positions, and solenoids means operatively connected to the ejector elements for reciprocation thereof when aligned with the mold openings in the mold plate to eject a pair of patties of said moldable material with a severed sheet of material adhering thereto onto the conveyors.

2. A meat molding machine comprising a track frame having an inlet opening, a mold plate slidably mounted by the track frame for movement between limit positions projecting from opposite sides of the track frame along the direction of said movement, said mold plate having a mold opening, said mold opening being alternatively aligned with the inlet opening and spaced therefrom in the limit positions of the mold plate, a supply conduit connected to the track frame, a backing member rigidly mounted in position on the track frame vertically spaced from the inlet opening therein to form a mold cavity with the mold opening communicating with the supply conduit through said inlet opening, an ejector assembly mounted in alignment with the mold opening in at least one of the limit positions of the mold plate said ejector assembly having a reciprocated ejector element movable through said mold opening, a roll of sheet material mounted below the track frame, guide means mounted between the ejector assembly and the inlet opening holding the sheet material in contact with the mold plate for adhesion to moldable material carried in the mold opening, cutting means automatically operative to sever the sheet material withdrawn from the roll in response to movement of the mold plate when the mold plate is in said one limit position thereof, means operatively connected to the mold plate for movement thereof between said limit positions, means operatively connected to the ejector element for reciprocation thereof when aligned with the mold opening in the mold plate to eject a patty of aid moldable material with a severed sheet of material adhering thereto.

3. The combination of claim 2 wherein said mold opening is adapted to receive an insert for dimensionally varying the mold cavity formed with the backing member.

4. The combination of claim 3 wherein said backing member includes a pressure plate and adjustable means for fixedly positioning the pressure plate for sliding engagement with the insert.

5. The combination of claim 2 wherein said means operatively connected to the mold plate for movement thereof includes a fluid operated piston mechanism and electrical means synchronizing movement of the mold plate by the fluid operated mechanism with reciprocation of the ejector element by the means operatively connected thereto for reciprocation thereof.

References Cited by the Examiner
UNITED STATES PATENTS

| | | | |
|---|---|---|---|
| 2,203,518 | 6/40 | Bauer | 17—32 |
| 2,683,284 | 7/54 | Anderson | 17—33 |
| 2,799,044 | 7/57 | Mahan | 17—32 |
| 2,820,247 | 1/58 | Michaud | 17—32 |

References Cited by the Applicant
UNITED STATES PATENTS

| | | |
|---|---|---|
| 2,530,062 | 11/50 | Holly. |
| 2,657,423 | 11/53 | Elsaesser. |
| 2,706,830 | 4/55 | Holly. |

SAMUEL KOREN, *Primary Examiner.*

LUCIE H. LAUDENSLAGER, *Examiner.*